United States Patent [19]
Harimoto et al.

[11] Patent Number: 5,711,074
[45] Date of Patent: Jan. 27, 1998

[54] METHOD OF PRODUCING SPLIT BEARINGS

[75] Inventors: Kazuyoshi Harimoto; Ikuo Fujiniwa, both of Iwata, Japan

[73] Assignee: NTN Corporation, Osaka-Fu, Japan

[21] Appl. No.: 451,362

[22] Filed: May 26, 1995

[30] Foreign Application Priority Data

May 31, 1994 [JP] Japan .................................. 6-117849

[51] Int. Cl.$^6$ .................................................. F16C 33/64
[52] U.S. Cl. ........................... 29/898.066; 29/417; 451/52
[58] Field of Search ...................... 29/898.063, 898.066, 29/412, 417; 451/52, 51

[56] References Cited

U.S. PATENT DOCUMENTS

| | | | |
|---|---|---|---|
| 1,675,728 | 7/1928 | Pierce, Jr. | |
| 2,648,578 | 8/1953 | Stearns et al. | 308/196 |
| 3,262,185 | 7/1966 | Hornigold | 29/898.066 |
| 3,471,913 | 10/1969 | Scott | 29/898.066 |
| 3,546,762 | 12/1970 | Martin | 29/898.066 |
| 4,643,595 | 2/1987 | Weavers | 29/898.063 |
| 5,261,159 | 11/1993 | Yasuda et al. | 29/898.066 |

Primary Examiner—David P. Bryant
Assistant Examiner—Marc W. Butler
Attorney, Agent, or Firm—Nikaido Marmelstein Murray & Oram LLP

[57] ABSTRACT

In a method of producing split bearings, comprising the steps of forming at least one of the two end surfaces of a bearing ring 1 with notches 2 being on a dividing line for splitting, and pressing the bearing ring 1 between upper and lower molds 4 and 5 along the dividing line on which the notches 2 are provided, the raceway surface 1a of the bearing ring 1 is ground in the shape of an ellipsoid which major diameter lies on the dividing line, and in that natural splitting is then effected.

6 Claims, 2 Drawing Sheets

```
FORMING THE TWO END SURFACES OF A BEARING RING
WITH NOTCHES BEING ON THE DIVIDING LINE FOR SPLITTING
                        │
                        ▼
GRINDING THE RACEWAY SURFACE OF THE BEARING RING
IN THE SHAPE OF THE ELLIPSOLD WHICH MAJOR DIAMETER LIES
ON THE DIVIDING LINE FOR SPLITTING
                        │
                        ▼
CAUSING NATURAL SPLITTING OF THE BEARING RING
```
FIG. 1
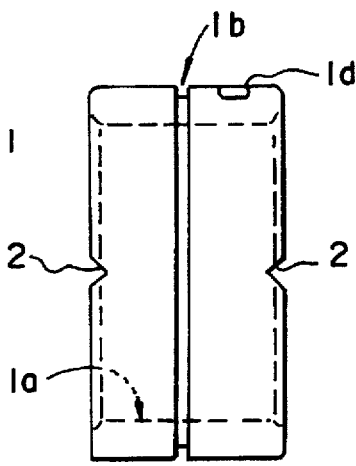
FIG. 2(A)
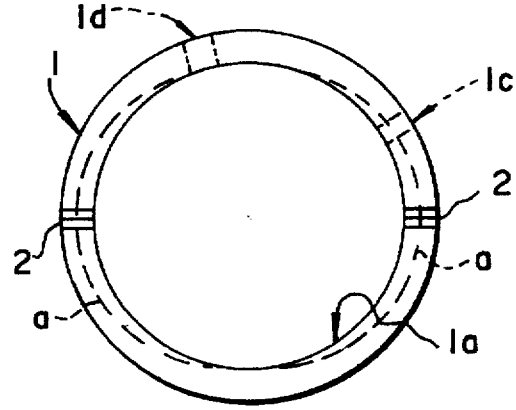
FIG. 2(B)
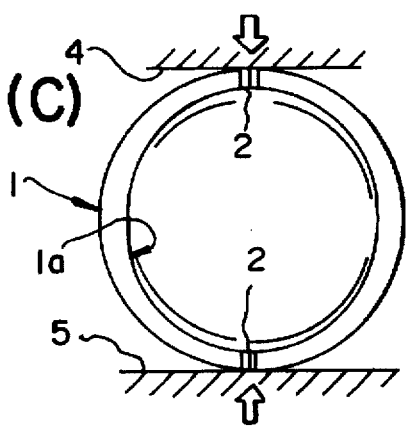
FIG. 2(C)
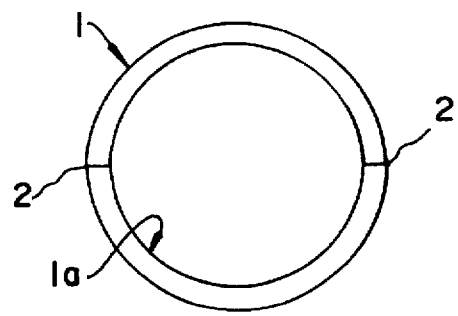
FIG. 2(D)

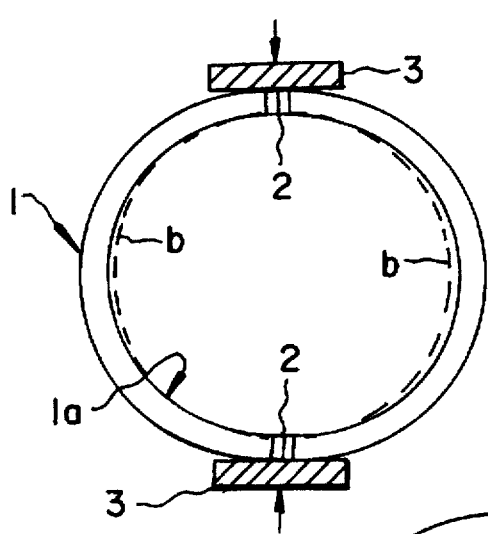
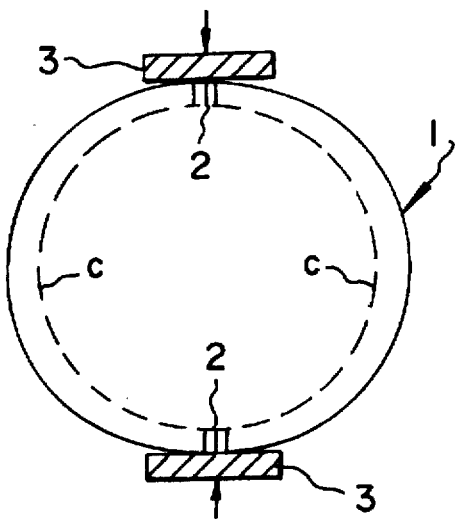
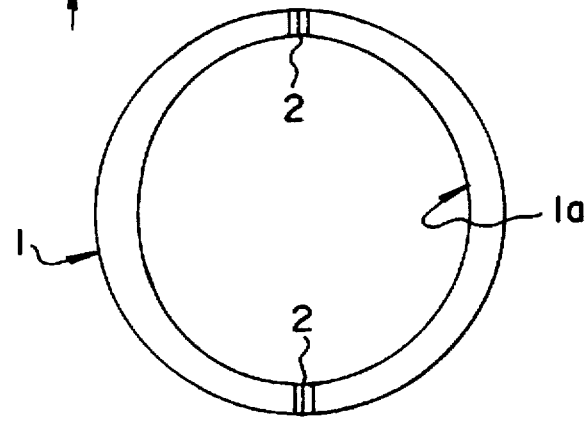
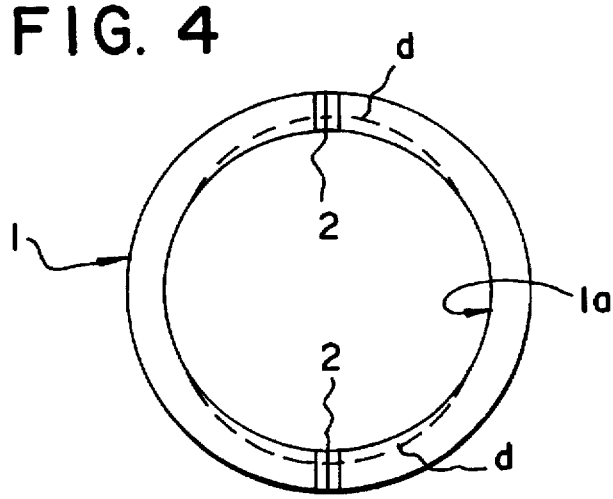

1

METHOD OF PRODUCING SPLIT BEARINGS

BACKGROUND OF THE INVENTION

The present invention relates to a method of producing split bearings used for supporting engine crank shafts, the large ends of connecting rods and the like.

Generally, engine crank shafts supporting bearings and connecting rod large-end supporting bearings are of two-split construction, and when such bearlug is to be mounted in a bearing mounting portion, the halves are assembled together in a unit and incorporated in said portion. Such two-splitting has led to the employment of natural splitting from the standpoint of prevention of deviation of split surfaces after being built-in and improved productivity and processability. Conventionally, bearing steel is used to produce a bearing ring of the bearing which is then formed with notches which induce splitting, the bearing ring is then pressed to cause natural splitting.

The aforesaid method comprises the steps of forming at least one of the two end surfaces of a bearing ring with notches extending on the dividing line for splitting, and pressing the bearing ring between upper and lower molds to deform it along the dividing line.

With this method however, the raceway surface of the bearing ring after splitting exhibits an oval shape with the minor diameter defined by the dividing line (such oval shape being hereinafter referred to as hourglass shape). If the bearing having the bearing rings of such shape is used as an engine crank shaft bearing or a connecting rod large-end bearing, therefore, the rolling elements repeatedly hit the butt-seam of the raceway surfaces, thus not only producing vibration and noise but also presenting problems such as accelerated fatigue fracture and decreased life.

To solve said problems, the present applicant has already proposed method in which natural splitting is effected after a residual stress has been generated in one of the inner and outer surfaces of the bearing rings (see Japanese Patent No. 16851/86).

According to the aforesaid method, a residual stress is expected to provide an ellipsoid shape having the major diameter defined by the dividing line; however, there are cases in which predetermined effects cannot be obtained depending on the size and thickness of the bearing ring. A further problem is that the means for generating a residual stress in the bearing ring, irrespective of whether said means is sand blasting, rolling, high frequency heat treatment or the like, it belongs to an off-line process different from the usual producing process, takes considerable man-hour.

SUMMARY OF THE INVENTION

An object of the invention is to prevent vibration and noise from being generated in the butt seam of the raceway surface of a bearing ring and to improve the bearing life, which features can be reliably attained irrespective of the size and thickness of the raceway ring, thereby improving productivity.

To achieve the object, the invention provides a method of producing split bearings, comprising the steps of forming at least one of the two end surfaces of a bearing ring with notches being on the dividing line for splitting, and pressing the bearing ring between upper and lower molds along the dividing line, thereby deforming the bearing ring to split it along the dividing line, wherein a raceway surface of the bearing ring is ground in the shape of an ellipsoid which major diameter lies on the dividing line prior to the splitting.

Since the raceway surface of the bearlug surface is ground in the shape of the ellipsoid which major diameter is on the dividing line, the subsequent natural splitting results in the bearing ring being deformed in the direction in which the major diameter is shortened alone the dividing line, whereby the raceway surface is brought closer to a true circle. In addition, even if the raceway surface does not take the shape of a true circle, the state in which the dividing line defines the major diameter of the ellipsoid ensures that it is assembled in a bearing housing, the inner peripheral surface and the like of the bearing housing corrects the shape to a true circle, thereby preventing the generation of vibration and noise due to hitting of the rolling elements in the butt-seam of the raceway surface and improving the bearing life.

Therefore, the invention prevents the generation of vibration, noise and the like due to the rolling elements hitting the butt seam of the raceway surface of this type of naturally split bearing, and decreases fatigue failure and the like of bearings, thus increasing the life; such merits can be reliably attained irrespective of the size and thickness of the bearing ring. Furthermore, the operating of grinding the raceway surface of the bearing ring can be performed during the normal grinding production process for this type of bearings, contributing to improvement of productivity, making it possible to reduce man-hour.

BRIEF DESCRIPTION OF THE DRAWINGS

FIG. 1 is a diagram showing the order of processing according to the invention.

FIG. 2 (A), (B), (C), (D) is explanatory views showing the present invention applied to a outer bearing ring.

FIG. 3 (A), (B), (C) is explanatory views showing an example of a method of grinding the inner diameter surface of an enter bearing ring to give an ellipsoid shape.

FIG. 4 is explanatory views showing another example of a method of grinding the inner diameter surface of a bearing outer ring to give an oval shape.

DESCRIPTION OF THE PREFERRED EMBODIMENTS

Embodiments of the invention will now be described.

FIG. 1 shows a diagram showing the order of processing according to the method of the present invention, the method comprising the steps of forming at least one of the two end surfaces of a bearing ring with V-shaped notches which results in the starting points inducing natural splitting, grinding the raceway surface of the bearing ring in the shape of an ellipsoid which major diameter lies on the dividing line for splitting with the notches used as a criterion, and causing natural splitting of the bearing ring.

FIG. 2 (A), (B) shows the present invention applied an outer bearing ring. 1, wherein notches 2 are formed in the splitting-scheduled surface of the outer bearing ring 1. And the raceway surface 1a is ground in an ellipsoid shape as indicated by broken lines a in FIG. 2 (B) such that positions of formation of the notches 2 define the major diameter of the ellipsoid. In the figure, the difference in length between the minor and major diameters of the ellipsoid is shown greatly exaggerated as compared with the real difference in length in order to help understand the invention, the real difference in length being on the order of tens of raceway surface such that the dividing line defines the μm at most (for example, 50 μm). That is, this of tens of μm at most (for example, 50 μm). That is, this difference in length between the minor and major diameter of the ellipsoid is set to a value equal to or slightly greater than the amount (dimension) of the deformation of the bearing ring during aftermentioned natural splitting is effected.

As for the method of grinding in the shape of the ellipsoid, as show in FIG. 3 (A), the outer bearing ring 1 is chucked by chuck teeth 3 to press the outer surface on the diametrical line passing through the positions of formation of the notches 2 and is thereby elastically deformed in an ellipsoid shape by an amount equal to said dimensional difference. The direction of the major diameter of the ellipsoid chucked in this state, as shown in solid line in FIG. 3 (A), is spaced 90° C. from the dividing line. In the state before chucking, its shape is a true circle, as shown in broken lines b in FIG. 3 (A). In this chucked state the state shown in solid line in FIG. 3 (A), the raceway surface 1a of the outer bearing ring 1 is ground in a true circle shape as shown in broken lines c in FIG 3 (B) by a grinding stone (not shown). After grinding, the pressing force from the chuck is removed, whereupon the outer bearing ring 1 is restored by an amount corresponding to the elastic deformation, whereby the raceway surface 1a of the outer bearing ring 1 takes an ellipsoid shape having its major diameter lying on the diametrical line (dividing line) passing through the positions of formation of the notches 2, as shown in solid line in FIG. 3 (C). The grinding of the raceway surface 1a of the outer bearing ring 1 in the ellipsoid shape may be effected by other method than the one described above. For example, as shown in FIG. 4, the major diameter side of the ellipsoid after grinding, i.e., the raceway surface 1a of the outer bearing ring 1 may be ground in crescent shape as shown in broken lines d on the opposite sides of the diametrical line (dividing line) passing through the positions of formation of the notches 2. It goes without saying that the amount of material to be removed from the raceway surface 1a is determined from the aforesaid dimensional difference.

After the raceway surface 1a of the outer bearing ring 1 has been ground in this manner in the ellipsoid shape having its major diameter being on the diametrical line (dividing line) passing through the positions of formation of the notches 2, the outer bearing ring 1 is pressed, as shown in FIG. 2 (C), by the upper and lower molds 4 and 5 at the opposite sides of and along the diametrical line (dividing line), whereupon internal stresses (tensile stresses) concentrate in the notches 2, and break splitting, or the so-called natural splitting starting at said notches 2 takes place. The raceway surface 1a of the outer bearing ring 1 in this naturally splitted state, as shown in FIG. 2 (D), has an ellipsoid shape (hereinafter referred to for convenience as lemon shape) having the major diameter lying on the dividing line.

During said natural splitting, since the outer bearing ring 1 involves deformation in the pressing direction, the present invention, allowing for the amount of this deformation, is intended to grind in advance the raceway surface 1a in the ellipsoid shape having its major diameter defined by this direction. Thereby, it follows that the raceway surface 1a of the outer bearing ring 1 is theoretically corrected to the shape of a true circle. Practically, though not theoretically perfect, it should be clear that it approaches to the shape of a true circle, and furthermore, when it is built in a bearing housing for an engine crank shaft. It is corrected to the shape of a true circle by the inner peripheral surface of said housing.

The naturally split outer bearing ring 1, as shown in FIG. 2 (A), has a round type circlip fitted in stop ring groove 1b annularly formed in the outer surface of it prior to splitting and is then built in said bearing housing. In addition, in FIG. 2 (B), 1c denotes an oil hole and 1d denotes a hole for receiving a knock pin for prevention of rotation after build-in.

The embodiment described above, which has been shown applied to a outer bearing ring, is also applicable to an inner bearing ring.

What is claimed is:

1. A method of producing a split bearing, comprising:
   (a) providing a bearing ring, said bearing ring having a raceway surface;
   (b) forming a first notch and a second notch on said bearing ring, said first notch being opposite said second notch;
   (c) grinding said raceway surface of said bearing ring in a shape of an ellipsoid to form two thin-ring portions each having a first ring thickness and two thick-ring portions each having a second ring thickness, wherein said first ring thickness is less than said second ring thickness, one of said two thin-ring portions being adjacent said first notch and the other of said two thin-ring portions being adjacent said second notch; and
   (d) thereafter splitting the bearing ring by pressing the bearing ring between upper and lower molds to split the bearing ring at said first notch and said second notch.

2. The method of claim 1, wherein said bearing ring has two end surfaces, and said first notch and said second notch are each formed on a same or different end surface of the two end surfaces.

3. The method of claim 2, wherein said first notch and said second notch are each formed on a same end surface of the two end surfaces.

4. The method of claim 2, wherein said forming step (b) further comprises forming a third notch and a fourth notch on said bearing ring, wherein said third notch is formed on a different end surface of the two end surfaces relative to said first notch such that a line of intersection between said third notch and said first notch is parallel to a longitudinal axis of said bearing ring, and said fourth notch is formed on a different end surface of the two end surfaces relative to said second notch such that a line of intersection between said fourth notch and said second notch is parallel to a longitudinal axis of said bearing ring.

5. The method of claim 4, wherein in said splitting step (d), said bearing ring is split along said line of intersection.

6. The method of claim 1, wherein the ellipsoid has a major diameter, said major diameter being perpendicular to a longitudinal axis of said bearing ring.

* * * * *